（12）United States Patent
Chapman et al.

(10) Patent No.: US 7,720,101 B2
(45) Date of Patent: May 18, 2010

(54) WIDEBAND CABLE MODEM WITH NARROWBAND CIRCUITRY

(75) Inventors: John T. Chapman, Saratoga, CA (US); David B. Fox, Bolton, MA (US); Albert A. Slane, Cottage Grove, WI (US)

(73) Assignee: Cisco Technology, Inc., San Jose, CA (US)

( * ) Notice: Subject to any disclaimer, the term of this patent is extended or adjusted under 35 U.S.C. 154(b) by 844 days.

(21) Appl. No.: 11/134,659

(22) Filed: May 20, 2005

(65) Prior Publication Data

US 2005/0265394 A1 Dec. 1, 2005

Related U.S. Application Data

(60) Provisional application No. 60/574,506, filed on May 25, 2004, provisional application No. 60/574,876, filed on May 26, 2004, provisional application No. 60/622,312, filed on Oct. 25, 2004, provisional application No. 60/624,490, filed on Nov. 1, 2004, provisional application No. 60/635,995, filed on Dec. 13, 2004, provisional application No. 60/588,635, filed on Jul. 16, 2004, provisional application No. 60/582,732, filed on Jun. 22, 2004, provisional application No. 60/590,509, filed on Jul. 23, 2004.

(51) Int. Cl.
*H04J 1/00* (2006.01)
*H04J 3/16* (2006.01)
*H04N 7/173* (2006.01)

(52) U.S. Cl. ........................ 370/480; 370/465; 725/111; 725/117; 725/126

(58) Field of Classification Search ................. 370/480, 370/489, 536, 395.65, 395.61, 437–439, 370/465; 725/111, 117, 126
See application file for complete search history.

(56) References Cited

U.S. PATENT DOCUMENTS

| 4,977,593 A | 12/1990 | Balance |
| 5,153,763 A | 10/1992 | Pidgeon |
| 5,457,678 A | 10/1995 | Goeldner |
| 5,604,735 A | 2/1997 | Levinson et al. |

(Continued)

FOREIGN PATENT DOCUMENTS

WO 00/72509 11/2000

(Continued)

OTHER PUBLICATIONS

Postel, J., "User Datagram Protocol", RFC 768, Aug. 28, 1980, 3 pgs.

(Continued)

*Primary Examiner*—Kwang B. Yao
*Assistant Examiner*—Candal Elpenord
(74) *Attorney, Agent, or Firm*—Stolowitz Ford Cowger LLP

(57) ABSTRACT

A hybrid cable modem includes wideband circuitry configured to receive data over multiple different downstream channels at the same time. The wideband circuitry demodulates signals on the different downstream channels and then formats the demodulated signals back into packets or frames for sending out over an Internet Protocol (IP) home network. Narrowband cable modem circuitry is coupled to the wideband circuitry and selectively extracts Data Over Cable Service Interface Specifications (DOCSIS) data from one of the multiple downstream channels being processed by the wideband circuitry.

26 Claims, 6 Drawing Sheets

U.S. PATENT DOCUMENTS

| | | | |
|---|---|---|---|
| 5,724,510 A | 3/1998 | Arndt et al. | |
| 5,784,597 A | 7/1998 | Chiu et al. | |
| 5,805,602 A | 9/1998 | Cloutier et al. | |
| 5,918,019 A | 6/1999 | Valencia | |
| 5,931,954 A | 8/1999 | Hoshina et al. | |
| 5,933,420 A | 8/1999 | Jaszewski et al. | |
| 5,963,557 A | 10/1999 | Eng | |
| 6,023,769 A | 2/2000 | Gonzalez | |
| 6,078,595 A | 6/2000 | Jones et al. | |
| 6,101,180 A | 8/2000 | Donahue et al. | |
| 6,137,793 A | 10/2000 | Gorman et al. | |
| 6,233,235 B1 | 5/2001 | Burke et al. | |
| 6,233,246 B1 | 5/2001 | Hareski et al. | |
| 6,275,990 B1 | 8/2001 | Dapper et al. | |
| 6,381,214 B1 | 4/2002 | Prasad | |
| 6,418,324 B1 | 7/2002 | Doviak et al. | |
| 6,434,141 B1 | 8/2002 | Oz et al. | |
| 6,438,123 B1 | 8/2002 | Chapman | |
| 6,490,727 B1 | 12/2002 | Nazarathy et al. | |
| 6,510,162 B1 | 1/2003 | Fijolek et al. | |
| 6,516,345 B1 | 2/2003 | Kracht | |
| 6,546,017 B1 | 4/2003 | Khaunte | |
| 6,556,591 B2 | 4/2003 | Bernath et al. | |
| 6,640,248 B1 | 10/2003 | Jorgensen | |
| 6,693,878 B1 | 2/2004 | Daruwalla et al. | |
| 6,697,970 B1 | 2/2004 | Chisolm | |
| 6,698,022 B1 | 2/2004 | Wu | |
| 6,763,019 B2 | 7/2004 | Mehta et al. | |
| 6,763,032 B1 | 7/2004 | Rabenko et al. | |
| 6,771,606 B1 | 8/2004 | Kuan | |
| 6,804,251 B1 | 10/2004 | Limb et al. | |
| 6,819,682 B1 | 11/2004 | Rabenko et al. | |
| 6,847,635 B1 | 1/2005 | Beser | |
| 6,853,680 B1 | 2/2005 | Nikolich | |
| 6,857,132 B1 | 2/2005 | Rakib et al. | |
| 6,901,079 B1 | 5/2005 | Phadnis et al. | |
| 6,950,399 B1 | 9/2005 | Bushmitch et al. | |
| 6,959,042 B1 | 10/2005 | Liu et al. | |
| 6,993,016 B1 | 1/2006 | Liva et al. | |
| 6,993,353 B2 | 1/2006 | Desai et al. | |
| 6,996,129 B2 | 2/2006 | Krause et al. | |
| 7,006,500 B1 | 2/2006 | Pedersen et al. | |
| 7,023,882 B2 | 4/2006 | Woodward, Jr. et al. | |
| 7,039,049 B1 | 5/2006 | Akgun et al. | |
| 7,065,779 B1 | 6/2006 | Crocker et al. | |
| 7,067,734 B2* | 6/2006 | Abe et al. | 174/359 |
| 7,110,398 B2 | 9/2006 | Grand et al. | |
| 7,113,484 B1 | 9/2006 | Chapman et al. | |
| 7,116,643 B2 | 10/2006 | Huang et al. | |
| 7,117,526 B1 | 10/2006 | Short | |
| 7,139,923 B1 | 11/2006 | Chapman et al. | |
| 7,145,887 B1 | 12/2006 | Akgun | |
| 7,149,223 B2 | 12/2006 | Liva et al. | |
| 7,161,945 B1 | 1/2007 | Cummings | |
| 7,164,690 B2 | 1/2007 | Limb et al. | |
| 7,197,052 B1 | 3/2007 | Crocker | |
| 7,206,321 B1 | 4/2007 | Bansal et al. | |
| 7,209,442 B1 | 4/2007 | Chapman | |
| 7,269,159 B1 | 9/2007 | Lai | |
| 7,290,046 B1 | 10/2007 | Kumar | |
| 7,359,332 B2 | 4/2008 | Kolze et al. | |
| 7,363,629 B2 | 4/2008 | Springer et al. | |
| 7,548,558 B2* | 6/2009 | Rakib et al. | 370/466 |
| 2001/0010096 A1 | 7/2001 | Horton et al. | |
| 2001/0055319 A1 | 12/2001 | Quigley et al. | |
| 2001/0055469 A1 | 12/2001 | Shida et al. | |
| 2002/0009974 A1 | 1/2002 | Kuwahara et al. | |
| 2002/0010750 A1 | 1/2002 | Baretzki | |
| 2002/0023174 A1 | 2/2002 | Garret et al. | |
| 2002/0044225 A1* | 4/2002 | Rakib | 348/734 |
| 2002/0052927 A1 | 5/2002 | Park | |
| 2002/0067721 A1 | 6/2002 | Kye | |
| 2002/0073432 A1 | 6/2002 | Kolze | |
| 2002/0073433 A1 | 6/2002 | Furuta et al. | |
| 2002/0088003 A1 | 7/2002 | Salee | |
| 2002/0093935 A1 | 7/2002 | Denney et al. | |
| 2002/0093955 A1 | 7/2002 | Grand et al. | |
| 2002/0131403 A1 | 9/2002 | Desai et al. | |
| 2002/0131426 A1 | 9/2002 | Amit et al. | |
| 2002/0133618 A1* | 9/2002 | Desai et al. | 709/238 |
| 2002/0136203 A1 | 9/2002 | Liva et al. | |
| 2002/0141585 A1 | 10/2002 | Carr | |
| 2002/0144284 A1 | 10/2002 | Burroughs et al. | |
| 2002/0146010 A1 | 10/2002 | Shenoi et al. | |
| 2002/0147978 A1 | 10/2002 | Dolgonos et al. | |
| 2002/0154655 A1 | 10/2002 | Gummalla et al. | |
| 2002/0161924 A1 | 10/2002 | Perrin et al. | |
| 2002/0198967 A1 | 12/2002 | Iwanojko et al. | |
| 2003/0014762 A1* | 1/2003 | Conover et al. | 725/110 |
| 2003/0058794 A1 | 3/2003 | Pantelias et al. | |
| 2003/0061415 A1* | 3/2003 | Horton et al. | 710/30 |
| 2003/0066087 A1 | 4/2003 | Sawyer et al. | |
| 2003/0067944 A1 | 4/2003 | Sala et al. | |
| 2003/0101463 A1 | 5/2003 | Greene et al. | |
| 2003/0140131 A1 | 7/2003 | Chandrashekhar et al. | |
| 2003/0163341 A1 | 8/2003 | Banerjee et al. | |
| 2003/0214943 A1 | 11/2003 | Engstrom et al. | |
| 2003/0214982 A1 | 11/2003 | Lorek et al. | |
| 2004/0039466 A1* | 2/2004 | Lilly et al. | 700/95 |
| 2004/0045032 A1* | 3/2004 | Cummings et al. | 725/111 |
| 2004/0045037 A1 | 3/2004 | Cummings et al. | |
| 2004/0073902 A1 | 4/2004 | Kao et al. | |
| 2004/0101077 A1 | 5/2004 | Miller et al. | |
| 2004/0105403 A1 | 6/2004 | Lin et al. | |
| 2004/0105406 A1 | 6/2004 | Kayama et al. | |
| 2004/0143593 A1 | 7/2004 | Le Maut et al. | |
| 2004/0160945 A1 | 8/2004 | Dong et al. | |
| 2004/0163129 A1 | 8/2004 | Chapman et al. | |
| 2004/0181800 A1* | 9/2004 | Rakib et al. | 725/25 |
| 2004/0244043 A1 | 12/2004 | Lind et al. | |
| 2004/0248530 A1 | 12/2004 | Rakib et al. | |
| 2005/0018697 A1 | 1/2005 | Enns et al. | |
| 2005/0122976 A1 | 6/2005 | Poli et al. | |
| 2005/0138669 A1 | 6/2005 | Baran | |
| 2005/0198684 A1 | 9/2005 | Stone et al. | |
| 2005/0201399 A1 | 9/2005 | Woodward, Jr. et al. | |
| 2005/0220126 A1* | 10/2005 | Gervais et al. | 370/401 |
| 2005/0226257 A1 | 10/2005 | Mirzabegian et al. | |
| 2005/0232294 A1* | 10/2005 | Quigley et al. | 370/436 |
| 2005/0259645 A1 | 11/2005 | Chen et al. | |
| 2005/0265261 A1 | 12/2005 | Droms et al. | |
| 2005/0265309 A1 | 12/2005 | Parandekar | |
| 2005/0265338 A1 | 12/2005 | Chapman et al. | |
| 2005/0265376 A1 | 12/2005 | Chapman et al. | |
| 2005/0265392 A1 | 12/2005 | Chapman et al. | |
| 2005/0265394 A1 | 12/2005 | Chapman et al. | |
| 2005/0265397 A1 | 12/2005 | Chapman et al. | |
| 2005/0265398 A1 | 12/2005 | Chapman et al. | |
| 2005/0289623 A1* | 12/2005 | Midani et al. | 725/100 |
| 2006/0002294 A1 | 1/2006 | Chapman et al. | |
| 2006/0098669 A1* | 5/2006 | Enns et al. | 370/401 |
| 2006/0126660 A1 | 6/2006 | Denney et al. | |
| 2006/0159100 A1 | 7/2006 | Droms et al. | |
| 2006/0168612 A1 | 7/2006 | Chapman et al. | |
| 2007/0274345 A1 | 11/2007 | Taylor et al. | |
| 2008/0037545 A1* | 2/2008 | Lansing et al. | 370/392 |

FOREIGN PATENT DOCUMENTS

| | | |
|---|---|---|
| WO | 0072509 | 11/2000 |
| WO | 2005117310 | 12/2005 |

WO 2005117358 12/2005

OTHER PUBLICATIONS

Postel, Jon, Editor, "DARPA Internet Program Protocol Specification", RFC 791, Sep. 1981, 45 pages.
Deering, S., "Host Extensions for IP Multicasting", RFC 1112, Aug. 1989.
Droms, R., "Dynamic Host Configuration Protocol", RFC 2131, Mar. 1997.
Townsley, W., et al., "Layer Two Tunneling Protocol "L2TP"", RFC 2661, Aug. 1999, 80 pages.
Cable Television Laboratories, Inc., "Data-Over-Cable Service Interface Specifications DOCSIS 2.0, Radio Frequency Specification", SP-RFIv2.0-I04-030730, 1999-2003, 512 pages.
Cable Television Laboratories, Inc., "Data-Over-Cable Service Interface Specifications DOCSIS2.0, Radio Frequency Interface Specification", CM-SP-RFIv2.0-I08-050408, Annex C, pp. 339-390, Copyright 1999-2005.
Cable Television Laboratories, Inc., "Data-Over-Cable Service Interface Specifications DOCSIS 2.0, Radio Frequency Specification", CP-SP-RFIv2.0-I09-050812, 1999-2005, 534 pages.
Cable Television Laboratories, Inc., "DOCSIS® Set-top Gateway (DSG) Interface Specification" CM-SP-DSG-I02-040804, Copyright 2001-2004.
Cable Television Laboratories, Inc., "DOCSIS® Set-top Gateway (DSG) Interface Specification" CM-SP-DSG-I04-050408, Copyright 2001-2005.
Bhattacharyya, et al., "An Overview of Source-Specific Multicast (SSM)", RFC 3569, Jul. 2003.
Droms, R., et al., "Dynamic Host Configuration Protocol for IPv6 (DHCPv6)", RFC 3315, Jul. 2003.
Droms, R., "Stateless Dynamic Host Configuration Protocol (DHCP) Service for IPv6", RFC 3736, Apr. 2004.
Chapman, John T., "CMTS Remote PHY for a DOCSIS Network: DMPI Over IP Protocol Specification", RP-SP-DoIP-D1-040715B.doc, Cisco Systems, Inc., EDCS-387722, May 26, 2004.
Cisco Systems, Inc., DHCP and the DOCSIS Configuration File for Cable Modems (DOCSIS 1.0), Document ID: 10961, Sep. 16, 2004.
IEEE Standards, "802.16, IEEE Standard for Local and Metropolitan Area Networks, Part 16: Air Interface for Fixed Broadband Wireless Access Systems", IEEE Std. 802.16—2004, Oct. 1, 2004, 893 pages.
Cable Television Laboratories, Inc., "Data-Over-Cable Service Interface Specifications Modular CMTS", CM-SP-DEPI-W03-050302, 49 pgs., Copyright 2005.
Ramakrishnan, Sangeeta, "Next Generation Edge—Realizing the vision of shared resources and bandwidth", SCTE Conference on Emerging Technologies, Jan. 11-13, 2005, 16 pgs.
Chapman, John T., "Remote PHY Technical White Paper Addendum," Downstream External PHY Interface Specification, Cisco Systems, Inc., EDCS-377253, Jan. 24, 2005.
Cisco Systems, Inc., "Downstream External PHY Interface Specification", SP-DEPI-W2-041101A.DOC, EDCS-408926, Jan. 25, 2005.
Lau, J., et al., "Layer Two Tunneling Protocol—Version 3 (L2TPv3)," RFC 3931, Mar. 2005, 94 pages.
Cable Television Laboratories, Inc., "DOCSIS Radio Frequency Interface Specification", CM-SP-RFIv2.0-I10-051209, 538 pgs., Dec. 9, 2005.
Madvinsky, et al., Don't Let Your Modem Be Cloned, Jun. 2000, pp. 1-7, Communications Technology.
Millet, Theft of Service-Inevitable?, Dec. 2005, pp. 1-4, Communications Technology.

ETSI, Data-Over-Cable Systems Part 2 Radio Frequency Interface Specifications, Jan. 2003, pp. 59-66, ES 201 488-2 V1.2.1.
Desai, et al., FastChannel: A Higher-Speed Cable Data Service, AT&T Labs-Research, pp. 1-13.
Adoba, et al., Extensible Authentication Protocol (EAP), RFC 3748, Jun. 2004, pp. 1-64, Standards Track.
ITU-T Telecommunication Standardization Sector of ITU, Series J: Cable Networks And Transmission of Television, Sound Programme and Other Multimedia Signals, Interactive Systems for Digital Television Distribution, Recommendation J.122, Dec. 2002, 506 pages, International Telecommunication Union.
Ramakrishnan, Sangeeta, "Next Generation Edge—Realizing the vision of shared resources and bandwidth", date unknown, 16 pgs.
Cisco Systems, Inc., "Downstream External PHY Interface Specification", SP-DEPI-W2-041101A.DOC, EDCS-408926, date unknown.
Chapman, John T., "Remote PHY Technical White Paper Addendum," Downstream External PHY Interface Specification, Cisco Systems, Inc., EDCS-377253, date unknown.
Cable Television Laboratories, Inc., "Data-Over-Cable Service Interface Specifications DOCSIS 2.0, Radio Frequency Interface Specification", CM-SP-RFIv2.0-I08-050408, Annex C, pp. 339-390, © 1999-2005.
Cable Television Laboratories, Inc., "DOCSIS Radio Frequency Interfaces Specification", CM-SP-RFIv2.0-I10-051209, 538 pgs., Dec. 9, 2005.
Data Over Cable Service Interface Specification, Aug. 4, 1997.
Ethereal: Display Filter Reference: DOCSIS Upstream Channel Descriptor, Webarchivedate Apr. 27, 2004.
DOCSIS Set Top Gateway (DSG) interface specification, Feb 28, 2002.
An Overview of Internet Protocols, Dann, Jan. 1998.
Patrick, M.; RFC3046-DHCP Rely Agent Information Option; The Internet Society (2001) http://www.faqs.org/rfcs/rfc3046.html; Jan. 2001; 11 pages.
Cable Television Laboratories, Inc., Interim Specification, Data-Over-Cable Service Interface Specifications, Radio Frequency Specification, SP-RFIv1.1-I02-990731, Jul. 30, 1999, 353 pages.
Cable Television Laboratories, Inc., Interim Specification, Data-Over-Cable Service Interface Specifications, Radio Frequency Interface Specification, SP-RFIv1.1-I04-000407, Apr. 7, 2000, 376 pages.
3COM, High-Speed Cable Internet Solutions, http://www.3com.com/cablenow/pdf/7125dsht.pdf, Dec. 1999, 4 pages.
Phuc H. Tran, USPTO Office Action Paper No. 20080427, May 1, 2008, 10 pages.
U.S. Appl. No. 11/292,725, Bernstein et al., "Advanced Multicast Support for Cable", filed Dec. 1, 2005.
U.S. Appl. No. 11/131,766, filed May 17, 2005, Chapman et al.
U.S. Appl. No. 11/137,606, filed May 24, 2005, Chapman et al.
U.S. Appl. No. 11/135,777, filed May 23, 2005, Chapman et al.
Thompson, et al. IPv6 Stateless Address Autoconfiguration, RFC 2462, Dec. 1998, pp. 1-24, Network Working Group.
Thompson, et al. IPv6 Stateless Address Autoconfiguration, RFC 4862, Sep. 2007, pp. 1-29, Network Working Group.
Hawa et al., "Quality of Service Scheduling in Cable and Broadband Wireless Access Systems," at http://www.ittc.ku.edu/publications/documents/Hawa2002_iwqos_paper.pdf, downloaded on Sep. 29, 2008.
Fellows et al., "DOCSIS Cable Modem Technology", IEEE Communication Magazine, vol. 39, Issue 3, Mar. 2001, pp. 202-209.

\* cited by examiner

WIDEBAND CABLE MODEM WITH NARROWBAND CIRCUITRY

CROSS REFERENCE TO RELATED APPLICATIONS

This application claims priority of U.S. provisional patent application No. 60/574,506, filed May 25, 2004, and U.S. provisional patent application No. 60/574,876, filed May 26, 2004, and U.S. provisional patent application No. 60/622,312, filed Oct. 25, 2004, and U.S. provisional patent application No. 60/624,490, filed Nov. 1, 2004, and U.S. provisional patent application No. 60/635,995, filed Dec. 13, 2004, and U.S. provisional patent application No. 60/588,635, filed Jul. 16, 2004, U.S. provisional patent application No. 60/582,732, filed Jun. 22, 2004, and U.S. provisional patent application No. 60/590,509, filed Jul. 23, 2004.

BACKGROUND

FIG. 1 shows how data over cable service interface specifications (DOCSIS) traffic is currently transferred over a cable network 8. A server or other type of Internet Protocol (IP) network processing device 10, such as a personal computer (PC), is connected to a wide area network (WAN) 12. The device 10 communicates over cable network 8 with a device 22 or device 26. In one example, the device 22 is an Internet Protocol (IP) set top box (STB) and the device 26 is a PC. Of course the devices 10, 22 and 26 can be any type computing device configured for exchanging data over a network.

A communication link is established between a cable modem termination system (CMTS) 14 on the cable provider end of a hybrid fiber cable (HFC) plant 19 and a cable modem (CM) 20 on the customer premises end of the HFC 19. The CMTS 14 operates at a cable system headend and receives and sends IP traffic over the WAN 12 in one example using an Ethernet connection. Other types of network interfaces may also be used such as Dynamic Packet Transport/Resilient Packet Ring (DPT/RPR) or Packet-over-SONET/SDH (POS). Data is transferred from the CMTS 14 to the CM 20 over a downstream channel 16 and data is transferred from the CM 20 to the CMTS 14 over an upstream channel 18.

The cable network 8 is referred to as "narrowband" because a single radio frequency (RF) downstream channel 16 and a single RF upstream channel 18 are used over the HFC plant 19 for transferring data. The single downstream channel 16 supplies downstream IP connectivity to multiple cable modems 20 connected to the same cable plant 19. Each cable modem 20 demodulates and formats the downstream traffic for transport over IP network 21. Upstream IP traffic sent by the IP device 22 or 26 is modulated by the associated CM 20 onto the upstream channel 18 on the HFC plant 19. The CMTS 14 demodulates the signals on the upstream channel 18 and then sends the demodulated IP data to a device on WAN 12, such as device 10.

FIG. 2 shows the internal elements in one of the narrowband cable modems 20. A diplexor 30 connects to the two-way HFC plant 19. The diplexer 30 separates the frequency spectrum for downstream channel 16 from the frequency spectrum for upstream channel 18. A radio frequency (RF) tuner 32 selectively outputs different baseband frequencies 36 to a DOCSIS narrowband cable modem integrated circuit (IC) 37. The baseband frequencies 36 are converted into digital signals by an analog/digital (A/D) converter 38 and then fed into a quadrature amplitude modulation (QAM) demodulator 40.

Both a DOCSIS media access controller (MAC) 46 and a central processing unit (CPU) 48 process the data output from the QAM 40. The MAC 46 is an open system interconnection (OSI) layer-2 element that provides DOCSIS framing and signaling. The MAC 46 frames the data into IP packets or frames that are then sent to the appropriate device 22 or 26 over Ethernet interface 52. Other data may be received or sent by the cable modem 20 over a universal serial bus (USB) connection 41 via USB interface 42.

Data received over Ethernet interface 52 is formatted for transport over the upstream channel 18 of the HFC 19 by the MAC 46 and then otherwise processed by the CPU 48. The formatted data is modulated by a QAM modulator 51 and then converted into analog signals by a digital/analog (D/A) converter 50. The output of D/A converter 50 is then amplified by an amplifier 56 before being transmitted by the diplexor 30 over the upstream channel 18 of the HFC 19. For clarity, the physical connections between the different functional elements 38-52 have not been shown.

The bandwidth provided by a single downstream channel 16 and a single upstream channel 18 on the HFC 19 may not be sufficient for the bursty traffic that can be transmitted and received by a large numbers of cable modems 20. Therefore, current cable systems may not be capable of supporting applications that have a high average bandwidth such as constant bit rate (CBR) or variable bit rate (VBR) video.

Wideband cable systems have been developed that increase bandwidth in cable networks. Wideband packets are associated with logical wideband channels that extend over multiple RF cable channels. The multiple wideband channels contain a number of wideband transport sub-channels which can be dynamically adjusted for varying bandwidth requirements.

The narrowband cable modem architecture shown in FIGS. 1 and 2 does not support wideband cable systems. However, it would be desirable to leverage this conventional narrowband DOCSIS cable modem circuitry in new wideband DOCSIS systems. The present invention addresses this and other problems associated with the prior art.

SUMMARY OF THE INVENTION

A hybrid cable modem includes wideband circuitry configured to receive data over multiple different downstream channels at the same time. The wideband circuitry demodulates signals on the different downstream channels and then formats the demodulated signals back into packets or frames for sending out over an Internet Protocol (IP) home network. Narrowband cable modem circuitry is coupled to the wideband circuitry and selectively extracts Data Over Cable Service Interface Specifications (DOCSIS) data from one of the multiple downstream channels being processed by the wideband circuitry.

The foregoing and other objects, features and advantages of the invention will become more readily apparent from the following detailed description of a preferred embodiment of the invention which proceeds with reference to the accompanying drawings.

DETAILED DESCRIPTION

Figure 3:
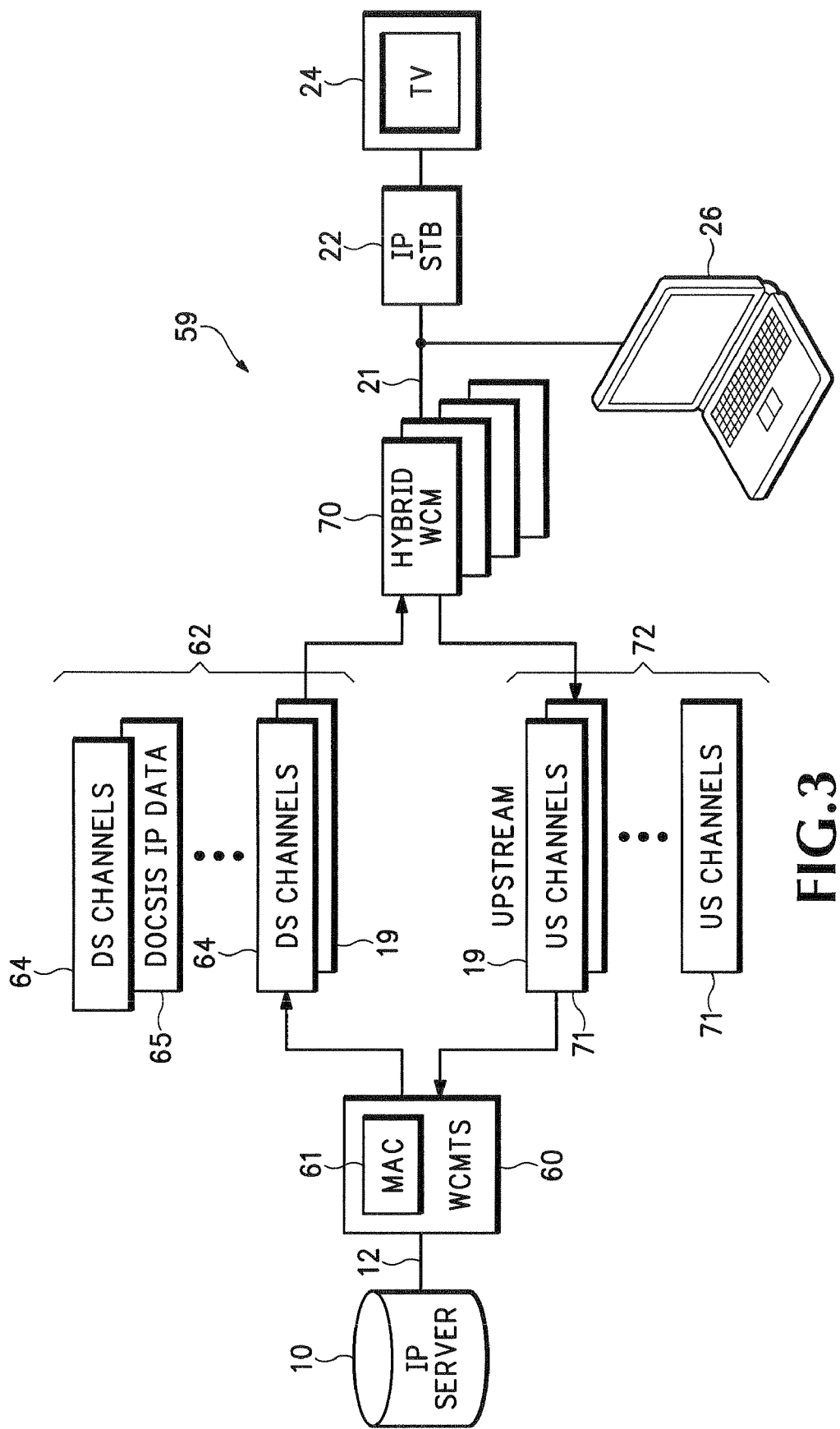
FIG. 3 is a diagram of a wideband cable network that uses a hybrid wideband cable modem.

Referring to FIG. 3, a hybrid wideband cable modem 70 leverages legacy narrowband cable modem circuitry and provides backward compatibility with existing narrowband cable modem protocols while at the same time providing wideband connectivity. In the description below packets and frames are used interchangeably. Thus, a frame is alternatively referred to as a packet and a packet is alternatively referred to as a frame.

A wideband CMTS (WCMTS) 60 includes a wideband transmit framer and a media access control (MAC) interface 61. In one embodiment, the wideband framer separates Ethernet frames from WAN 12 into wideband packets that are transmitted simultaneously over multiple downstream channels 64. The WCMTS 60 frames DOCSIS media access control (MAC) frames into Motion Picture Experts Group-Transport Stream (MPEG-TS) packets and transports the MPEG packets over the different downstream channels 64 in parallel. The multiple downstream channels 64 are referred to collectively as wideband channel 62.

In one example, the WCMTS 60 modulates the wideband channel 62 using quadrature amplitude modulation (QAM). Each downstream RF channel 64 is associated with a QAM and up-converter (U) (not shown). The Q&U's together modulate the MPEG digital data over multiple RF channels 64. The MAC 61 is used for transmitting DOCSIS IP data over one or more RF channels 64. For example, downstream channel 65 carries DOCSIS IP data in the downstream path to the hybrid WCMs 70.

Multiple upstream channels 71 can be established at the same time over the HFC plant 19 for sending data from the hybrid cable modems 70 to the WCMTS 60. The multiple upstream channels 71 are referred to collectively as the wideband upstream channel 72. The WCMTS 60 demodulates the IP traffic on the upstream channel 72 and the MAC 61 in the WCMTS 60 then formats the data for sending over the WAN 12. The MAC 61 can use the same Q&U for transmitting narrowband traffic, wideband traffic, or both narrowband and wideband traffic.

Figure 1:
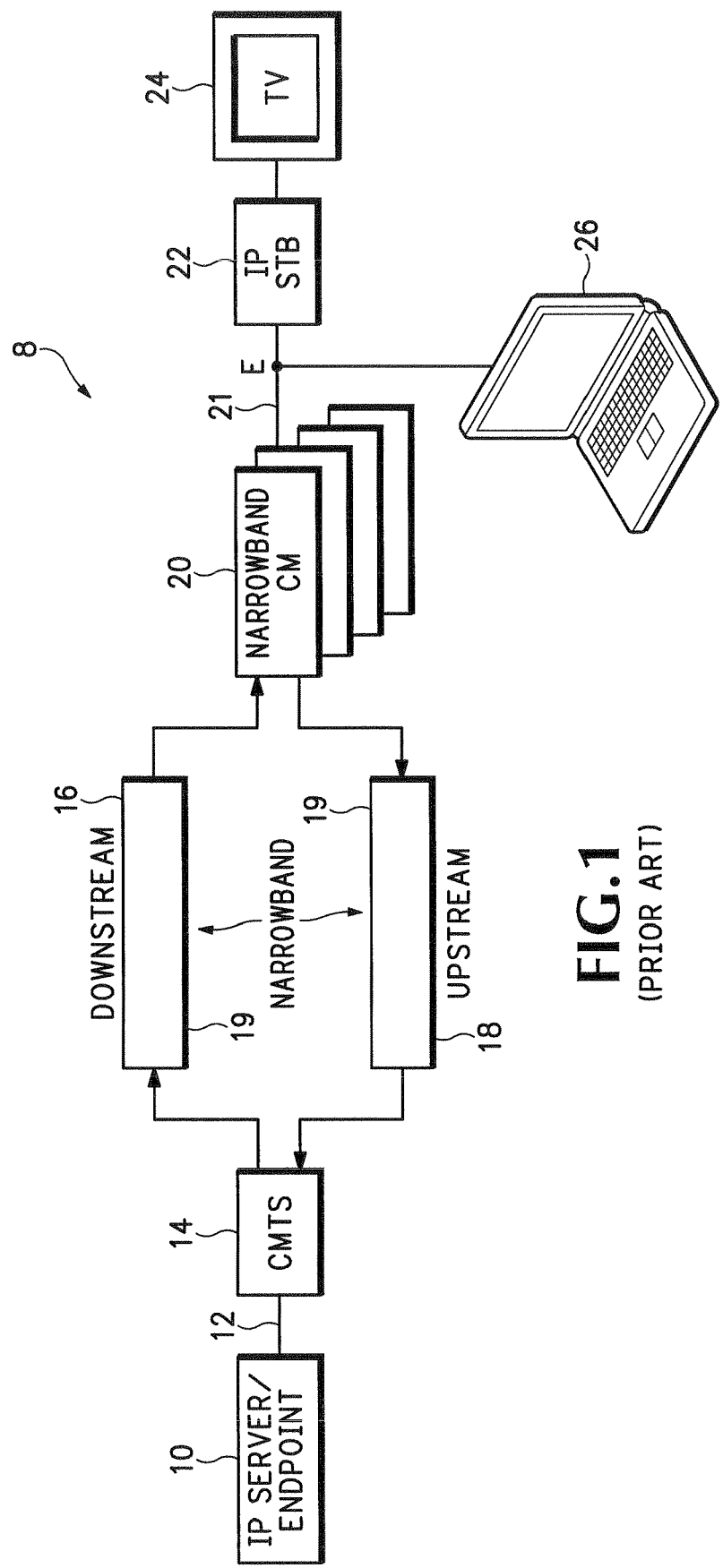
FIG. 1 is a diagram of a narrowband cable network.
Figure 2:
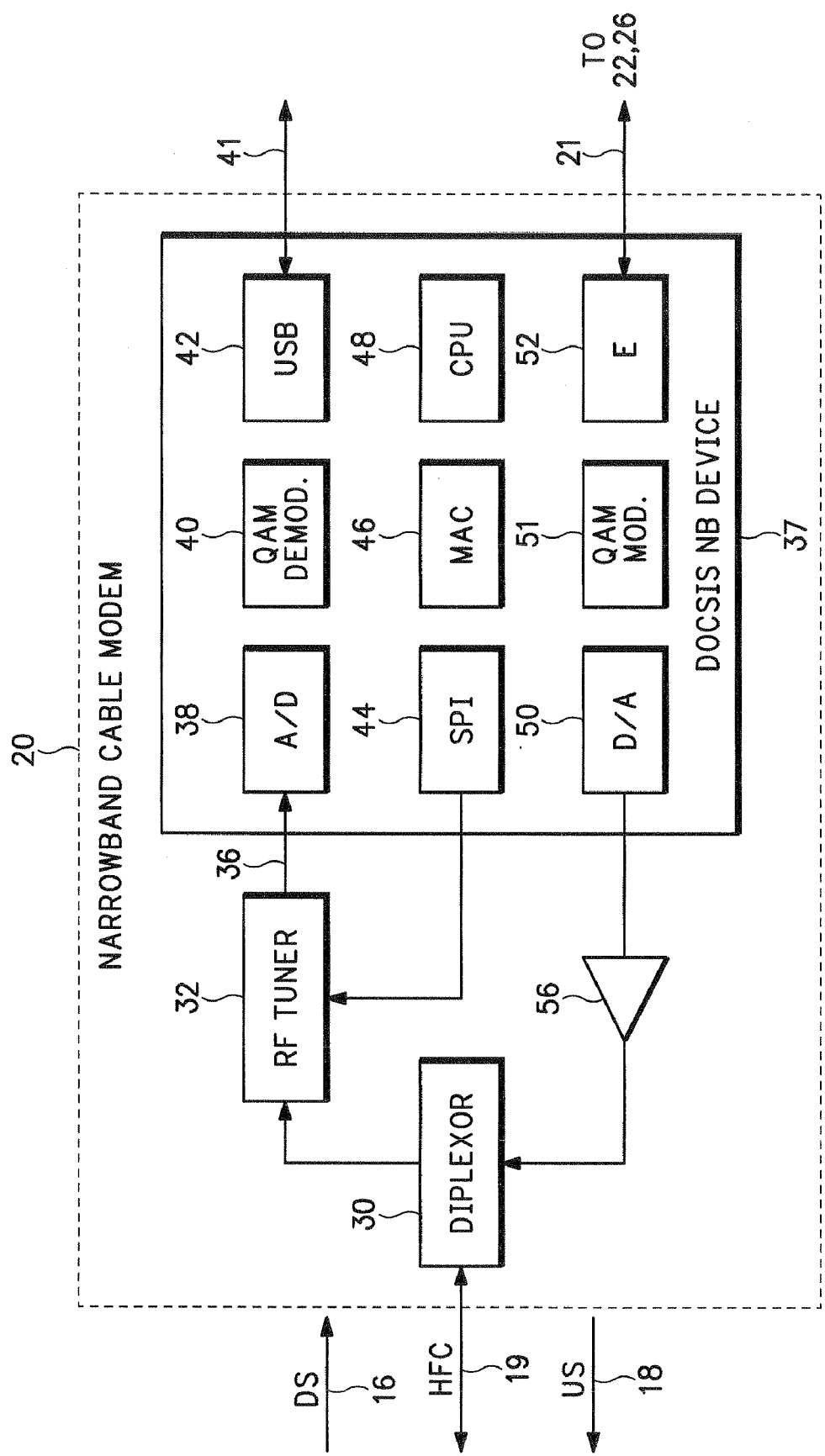
FIG. 2 is a block diagram of a narrowband cable modem used in the cable network shown in FIG. 1.

The downstream channels 64 can originate from a single multi-channel WCMTS 60 or from different WCMTSs 60 and can be directed to the same hybrid WCM 70 or to different hybrid WCMs 70. The RF upstream channels 71 can also operate independently or in conjunction with each other and can originate from the same or from different hybrid cable modems 70. The same cable network 59 can use any combination of narrowband CMs 20 (FIGS. 1 and 2), hybrid WCMs 70, and any other wideband cable modems.

Different architectures and protocols may be used for establishing the narrowband and wideband functionality between the WCMTS 60 and the hybrid WCM 70. Incorporated herein by reference are the following U.S. patent applications: WIDEBAND CABLE SYSTEM, application Ser. No. 10/358,416, filed Feb. 4, 2003; UPSTREAM PHYSICAL INTERFACE FOR MODULAR CABLE MODEM TERMINATION SYSTEM, application Ser. No. 11/131,766, filed May 17, 2005; WIDEBAND CABLE DOWNSTREAM PROTOCOL, application Ser. No. 11/137,606, filed May 24, 2005; and WIDEBAND UPSTREAM PROTOCOL application Ser. No. 11/135,777, filed May 23, 2005, issued as U.S. Pat. No. 7,532,627 that describe different wideband and narrowband systems that can be used with the hybrid WCM 70. Of course, other cable modem architectures can also be used.

The hybrid WCMs 70 simultaneously demodulates each of the different downstream channels 64 and regenerates the different portions of the original data stream received over IP network 12. In one example, the different portions of the data streams distributed over the different downstream channels 64 are reformatted back into Ethernet frames and sent over IP home network 21 either to the IP STB 22 or to PC 26. The IP STB 22 converts digital data contained in the Ethernet frames into analog signals for displaying on television 24. Ethernet frames received by PC 26 contain any type of digital data that is conventionally transmitted to a computing device over an IP network.

A "flow" refers to contiguous bytes of data used by a given application. The wideband implementation described below has the ability to spread the same flow over multiple downstream channels simultaneously.

Hybrid Cable Modem

Figure 4:
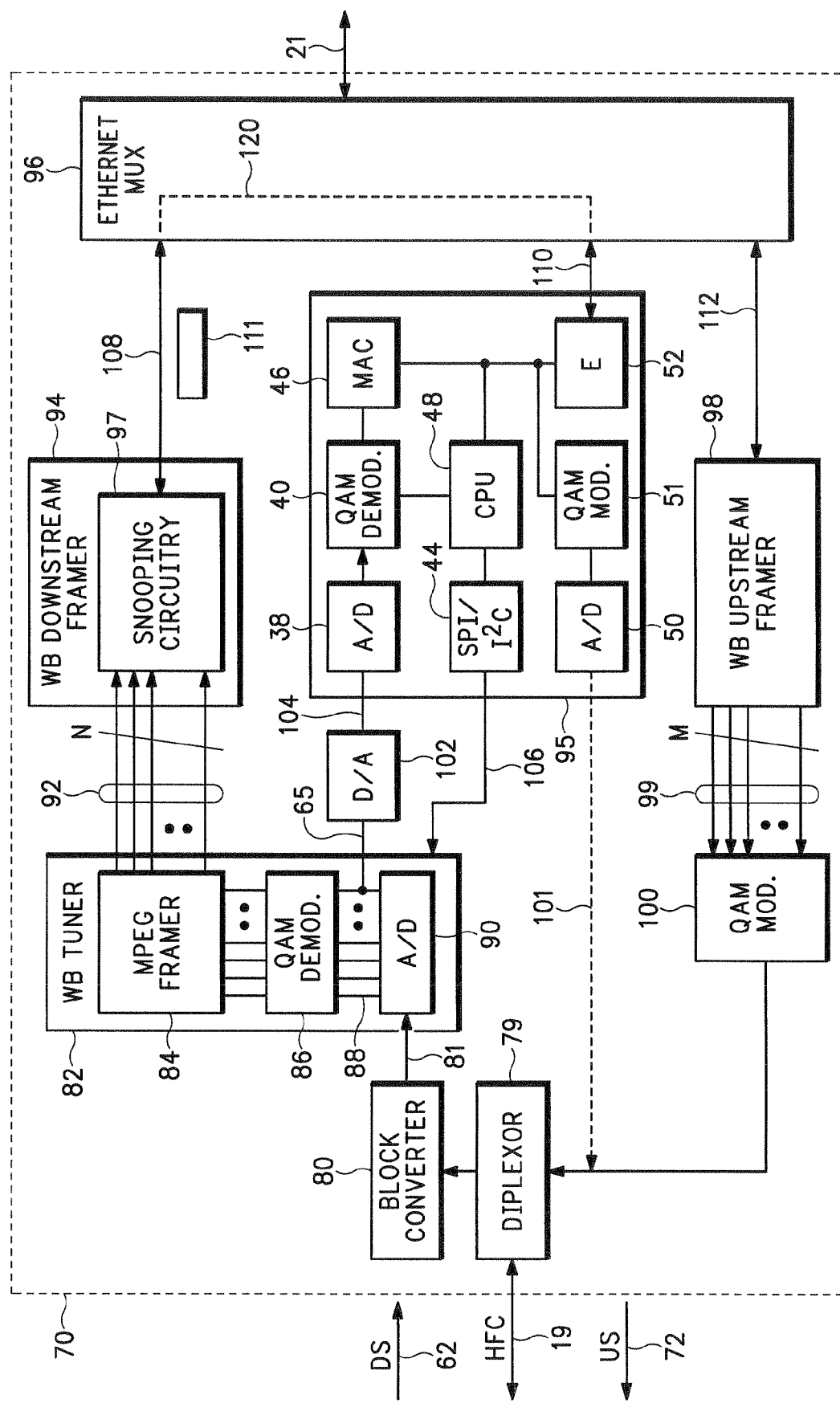
FIG. 4 is a detailed diagram of the hybrid wideband cable modem shown in FIG. 3.

FIG. 4 describes the hybrid WCM 70 in more detail. The wideband circuitry in the hybrid WCM 70 provides high bandwidth cable communications that is efficient and scalable in transporting Variable Bit Rate (VBR) data/voice/video IP streams in a DOCSIS compatible environment. Legacy DOCSIS narrowband cable modem (NBCM) 95 is interlaced with the wideband circuitry to maintain backward compatibility with existing narrowband cable systems.

Downstream

A diplexer 79 sends signaling from the downstream wideband channel 62 to a block down converter 80 that outputs RF signals 81 to a wideband (WB) tuner 82. The WB tuner 82 includes an internal A/D converter 90, a QAM demodulator 86, and an MPEG framer 84 all configured for processing signaling from the multiple downstream wideband channels 64 at the same time. The WB tuner 82 outputs MPEG frames 92 for all of the N downstream channels 62 to a WB downstream framer 94. The wideband downstream framer 94 reassembles the MPEG data from WB tuner 82 into the Ethernet frames originally received by the WCMTS 60 over WAN 12 and outputs the Ethernet frames to an Ethernet multiplexer (MUX) 96.

The NBCM 95 is coupled between the WB tuner 82 and the Ethernet MUX 96 and has similar functional elements as the narrowband cable modem circuitry 37 described above in FIG. 2. However, the CPU 48 in the NBCM 95 now controls the WB tuner 82 through an I²C bus interface. Alternatively, a Serial Peripheral Interconnect (SPI) bus interface 44 or some other type of interface can be used. The CPU 48 both programs and reads register information from the WB tuner 44 through the SPI bus 106.

The bus 106 is typically used for reading and writing registers from cable modem physical interfaces. Each bus 106 has a master device which may be the MAC 46. Alternatively, the bus 106 master may be some other device, such as the CPU 48. The WB tuner 82 in this implementation is the slave device. The SPI, or I2C bus 106 in general is known to those skilled in the art and is therefore not described in further detail.

The CPU 48, or MAC 46, sends instructions to the WB tuner 82 to connect a particular digital data stream 88 from A/D converter 90 to an external D/A converter 102. For example, the CPU 48 may configure the WB tuner 82 via bus 106 to connect one of the outputs 88 carrying DOCSIS IP data to D/A converter 102. For instance, the D/A converter 102 may be connected to the data stream 88 that corresponds with downstream channel 65 in FIG. 3.

The analog output 104 from D/A converter 102 is then processed as a conventional narrowband downstream channel by the NBCM 95. For example, the analog baseband signal 104 is converted into a digital signal by A/D converter 38, demodulated by a QAM demodulator 40, and then framed into Ethernet packets by MAC 46. The Ethernet frames are then sent out Ethernet interface 52 to Ethernet MUX 96. The Ethernet MUX 96 then forwards the Ethernet packets out IP network 21. Thus, the NBCM 95 can use the same A/D converter 38, QAM 40, CPU 48, MAC 46 and Ethernet interface 52 previously used in the narrowband cable modem 37 shown in FIG. 2.

The entire digital spectrum of the wideband downstream channel 62 is available to the NBCM 95. The CPU 48 can select any of the multiple available outputs 88 from the WB tuner 82. This eliminates having to use an additional narrowband tuner, such as tuner 32 in FIG. 2, for extracting DOCSIS data from the wideband channel 62. In an alternative embodiment, a separate narrowband tuner can be used with the NBCM 95. It should also be understood that any logical flow can extend over any combination of the multiple wideband downstream channels 62.

Upstream

The Ethernet MUX 96 directs packets received from IP network 21 to the NBCM 95 or to the wideband upstream framer 98. This allows the wideband upstream framer 98 to replace or co-exist with the upstream DOCSIS framing provided in NBCM 95. The DOCSIS protocol allows multiple devices to transmit on the same upstream frequency. Thus both the NBCM 95 and the WB upstream framer 98 can transmit over a common upstream channel 72.

The WB upstream framer 98 frames the Ethernet frames received from Ethernet MUX 96 into wideband DOCSIS data that is formatted into multiple different wideband upstream data streams 99. The DOCSIS data in the multiple different data streams 99 is modulated by multiple QAM modulators 100 onto multiple associated wideband RF channels 72 and output through diplexor 79 over the HFC 19.

The NBCM 95 may be required to also send data over one of the wideband upstream channels 72. In one implementation, the NBCM 95 sends the received Ethernet frames over the Ethernet MUX 96 to the WB upstream framer 98. The framer 98 and QAM modulator 100 then process and send the Ethernet frames received from the NBCM 95 over one of the wideband upstream channels 72.

In an alternative implementation, the Ethernet frames received by the NBCM 95 are formatted into DOCSIS frames by the local MAC 46 and then modulated onto one of the wideband upstream channels 72 by the local QAM modulator 51. The D/A converter 50 then outputs an analog RF signal over alternative connection 101 to the diplexor 79. The alternative path 101 is used by the NBCM 95 to send DOCSIS data over either one of the wideband upstream channels 72 or over some alternative upstream channel not used as one of the wideband upstream channels 72.

In some instances it may be more efficient to send and receive information from one of the narrowband or wideband elements and then share the results with the other wideband and narrowband circuitry. For example, data such as ranging information, may normally be sent and received from both the NBCM 95 and the WB upstream or downstream framers 98 or 94, respectively. However, the timing skew for both the wideband circuitry and the narrowband circuitry may be close to the same. Therefore, in one implementation, only one functional wideband or narrowband element, such as the NBCM 95 can be used for exchanging timing synchronization information with the CMTS 60 (FIG. 3). The timing information is then distributed to the other wideband functional elements in the hybrid cable modem 70.

Snooping Circuitry

The WCMTS 60 (FIG. 3) may send certain IP or DOCSIS messages over different wideband channels 62 that the CPU 48 in NBCM 95 needs to process. However, the D/A converter 102 may not be connected to the downstream channel that contains the IP or DOCSIS messages sent by the WCMTS 60. Snooping circuitry 97 in the WB downstream framer 94 in combination with a loop-back path 120 in the Ethernet MUX 96 allows the CPU 48 to receive and process DOCSIS messages sent on any WB channel 62.

The snooping circuitry 97 snoops all of the Ethernet packets 111 generated from all of the wideband channel data streams 92 received from the WB tuner 82. The snooping circuitry 97 is programmed to detect any Ethernet frames having a particular predetermined identifier and forward the detected Ethernet frames through the Ethernet MUX 96 to the CPU 48. For example, the snooping circuitry 97 can be programmed to identify any Ethernet frame with a header identifying DOCSIS control or signaling data.

The snooping circuitry 97, in combination with the Ethernet MUX 96, provides for fast forwarding plane switching path to the CPU 48. The snooping circuitry 97 also operates as a filter providing only relevant Ethernet frames to CPU 48. This relieves the processing burden on the CPU 48 having to listen to each Ethernet frame passing through the WB downstream framer 94 and also allows the same QAMs 86 in the WB tuner 82 to be used for both narrowband and wideband processing.

Ethernet Multiplexer

Figure 5:
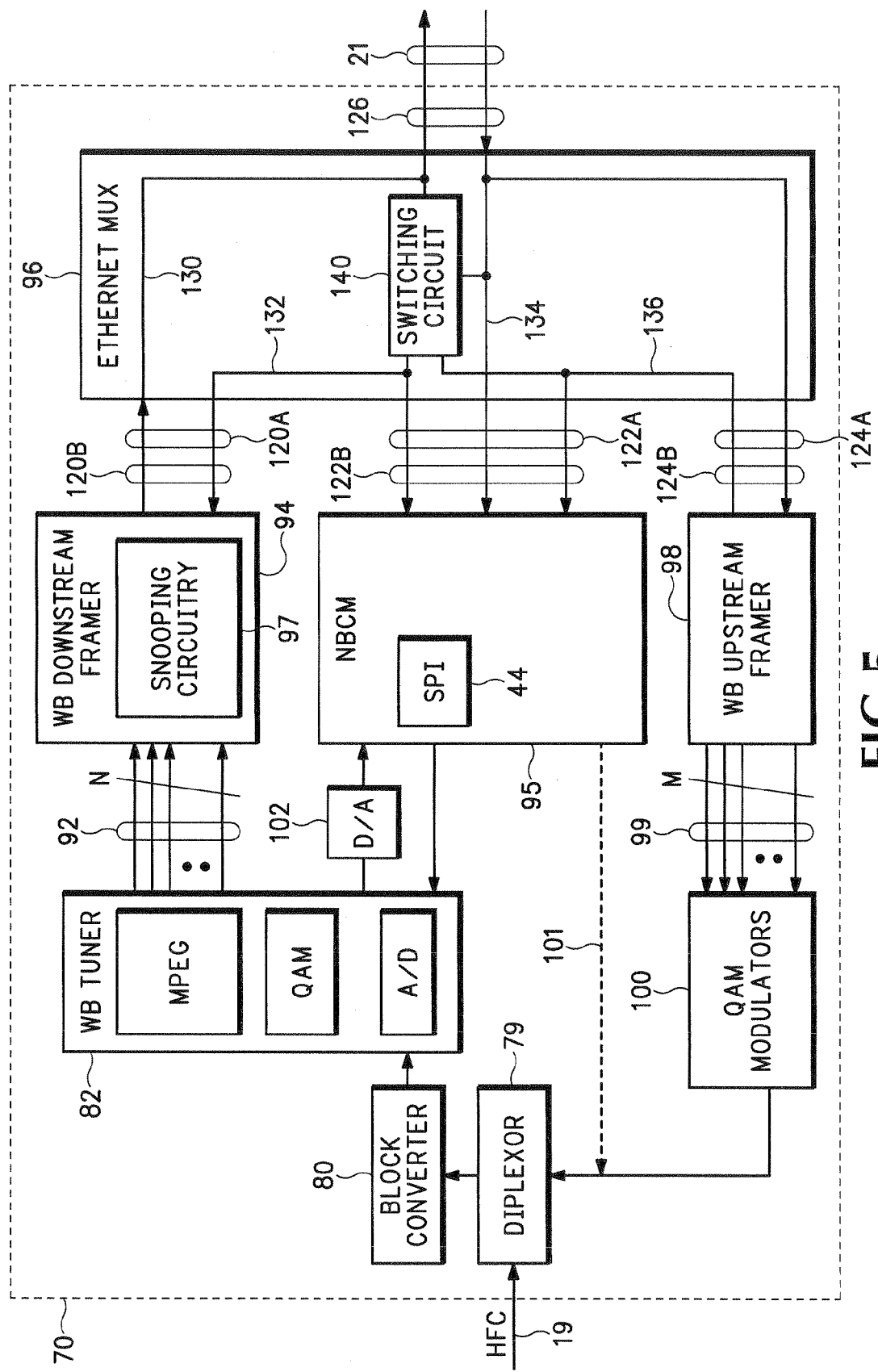
FIG. 5 shows in more detail an Ethernet multiplexer used in the hybrid wideband cable modem of FIG. 4.

FIG. 5 shows the Ethernet MUX 96 in more detail. The Ethernet MUX 96 includes a first Ethernet port 120A that connects with a corresponding Ethernet port 120B on the WB downstream framer 60. A second Ethernet port 122A on the MUX 96 is connected to a corresponding Ethernet port 122B on the NBCM 95. A third Ethernet port 124A on the MUX 96 connects with a corresponding Ethernet port 124B on the WB upstream framer 98. An external Ethernet port 126 is coupled to the IP home network 21 as described above in FIG. 3.

Switching circuit 140 in the Ethernet multiplexer 96 sends Ethernet frames received from WB downstream framer 84 or from NBCM 95 out over IP network 21. Ethernet frames are also switched between the NBCM 95 and the WB downstream framer 94 and between the NBCM 95 and the WB upstream framer 98. The Ethernet MUX 96 also forwards Ethernet frames received over IP network 21 either to the NBCM 95 or to the WB upstream framer 98.

FIG. 5 shows the logical paths taken by Ethernet frames or other IP packets though the different ports 120-126 in MUX 96. In a first path 130, the switching circuit 140 transfers packets or frames from the WB downstream framer 94 to external Ethernet port 126. In a path 132, the switching circuit 140 transfers packets between the WB downstream framer 94 and the NBCM 95. The switching circuit 140 in path 134 transfers packets between external Ethernet port 126, the NBCM 95, and the WB upstream framer 98. A path 136 transports packets between the NBCM 95 and the WB upstream framer 98.

In one embodiment of the Ethernet MUX 96, the switching circuit 140 switches frames or packets to the different Ethernet ports 120, 122, 124 and 126 according to tags that are identified in an Ethernet packet header. For example, a packet directed from WB downstream framer 94 to external Ethernet port 126 may have a first tag value in the Ethernet packet header. Other packets switched from the WB downstream framer 94 to the NBCM 95 are assigned a second tag value. Similarly, an Ethernet frame switched from the external Ethernet port 126 to the WB upstream framer 98 has a third tag value, etc.

The switching logic 140 in the Ethernet MUX 96 reads the tag value in the Ethernet header to determine where to direct the frame or packet. For example, a packet received over Ethernet port 120A having the first tag value is sent by switching logic 140 to the external Ethernet port 126 over path 130. Another packet received over Ethernet port 120A having the second tag value is sent by switching logic 140 to Ethernet port 122A over path 132.

In an alternative embodiment, the Ethernet MUX 96 operates more like a conventional Ethernet switch. In this implementation, the switching logic 140 reads an IP address in the Ethernet frames and outputs the frames to the different ports 120A-126A according to the addresses.

The Ethernet MUX 96 can be implemented on an individual Integrated Circuit (IC) or can be integrated on a same IC with any other logical elements in hybrid CM 70. For example, the Ethernet MUX 96 can be implemented on the same IC with the WB downstream framer 94. Any other combination of the logical devices 79, 80, 82, 94, 95, 96, 98 and 100 can be implemented in separate ICs or combined with the other logical devices on the same IC.

Some, but not all, of the important aspects of the hybrid cable modem 70 include using the D/A converter 102 to simulate a regular DOCSIS narrowband downstream channel. This in combination with using the SPI bus 44 to connect selected individual wideband channel data streams 88 to the NBCM 95 eliminates having to use separate tuners for wideband and narrowband processing.

Figure 6:
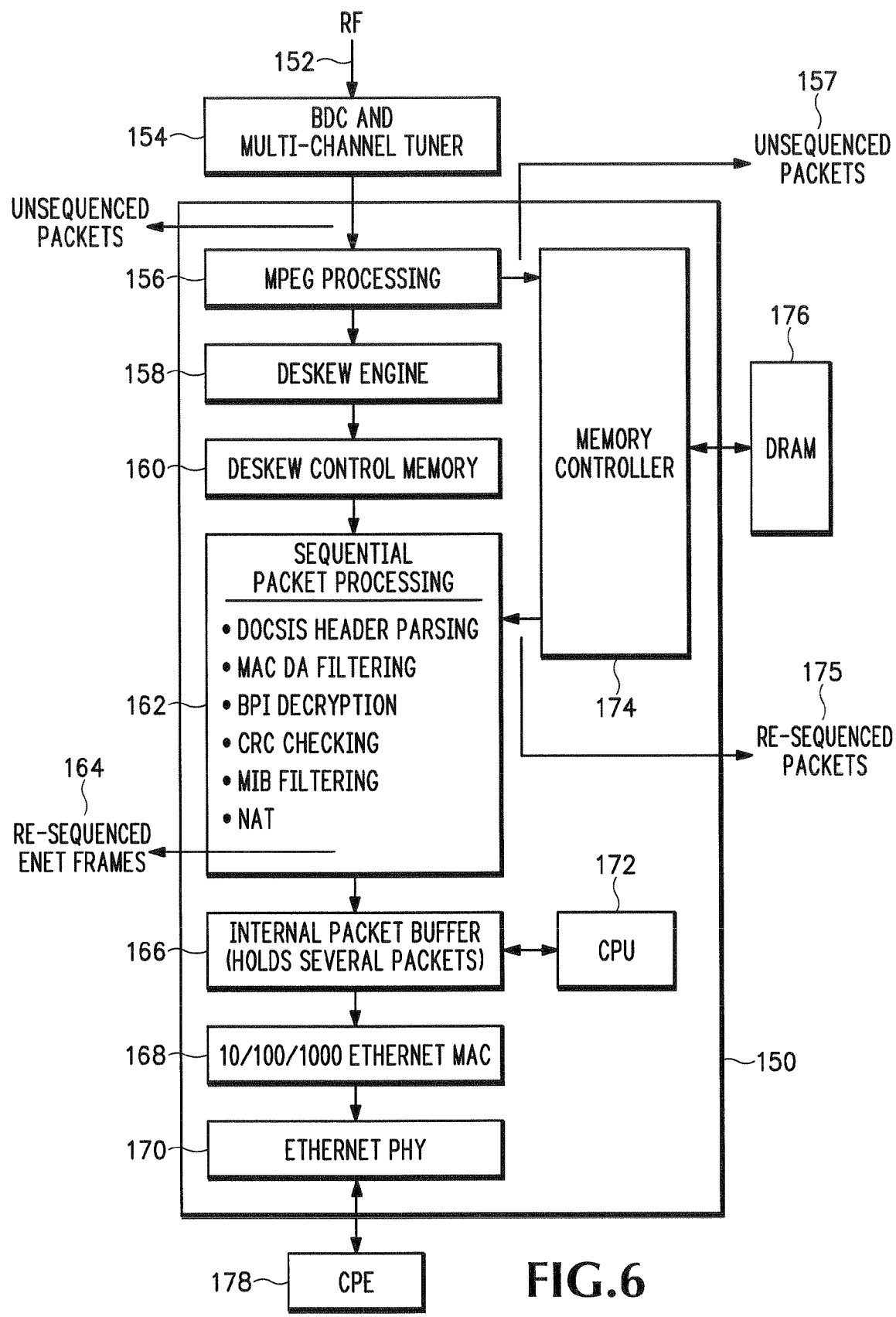
FIG. 6 shows another embodiment of the cable modem where certain packet processing operations are conducted in hardware without accessing external memory.

FIG. 6 shows another embodiment of a wideband cable modem 150 that can also include the functionality described above in FIGS. 3-5. An integrated circuit contains all the cable modem circuitry 150. In FIG. 6, the RF signals from the cable plant are received by a Block Down Converter (BDC) and multi-channel tuner 154. An MPEG processing engine 156 converts the output from tuner 152 into un-sequenced MPEG packets 157 that are then stored by memory controller 174 into an external memory 176, such as a Dynamic Random Access Memory (DRAM). The external memory 176 may be implemented in a different Integrated Circuit (IC), than the IC implementing cable modem circuitry 150. However, the external memory 176 could also be implemented in the same IC. A deskew engine 158 and a deskew control memory 160 use associated control information to re-sequence the packets in the correct order when read out of memory 176. The re-sequenced packets 175 are then sent to sequential packet processing circuitry 162.

In one embodiment, the sequential packet processing circuitry 162 is mostly performed in hardware in the same integrated circuit that implements cable modem 150. However, it is also possible that some of the higher level sequential packet processing operations may be performed in software by a CPU 172. If required, software operations performed by the CPU 172 use internal packet buffer 166.

The sequential packet processing circuitry 162 can include a DOCSIS header parser, MAC Destination Address (DA) filter, Baseline Privacy Interface (BPI) Decryption engine, Cyclic Redundancy Check (CRC) circuit, Management Information Base (MIB) filter, and a Network Address Translator (NAT). These packet processing algorithms are known to those skilled in the art and are therefore not described in further detail. However, conducting some or all of these packet processing operations in hardware is believed to be novel.

In one embodiment, each element or engine in sequential packet processing circuitry 162 passes the packet sequentially onto a subsequent element or engine. For example, the DOCSIS header parsing engine receives a packet from memory controller 174, processes the packet, and sends the processed packet to the MAC DA filtering engine. The MAC DA filtering engine processes the packet and sends the processed packet to the BPI decryption engine, etc.

Of course these are just examples of the packet processing operations that can be included in circuitry 162. Additional packet processing operations may be included in sequential packet processing circuitry 162 or some of the listed operations may not be included in the packet processing circuitry 162. Further, some of the packet processing operations, such as the NAT and other security packet processing operations, may be implemented by software operated by the CPU 172.

Implementing at least some of the above listed packet processing operations in hardware circuitry 162, prevents the cable modem 150 from having to repeatedly access external memory 176. For example, the cable modem 150 may only have to use external memory 176 to load un-sequenced packets 157 into memory and then read the re-sequenced packet 175 back out of external memory 176. The cable modem 150 then sequentially conducts subsequent packet processing operations internally with hardware circuitry 162. An internal packet buffer 166 can be used for any temporary buffering required by the sequential packet processing circuitry 162 or for any other software operations that may need to be performed on the packets by CPU 172.

The output of the sequential packet processing circuitry 162 is re-sequenced Ethernet frames 164 that are then processed by an Ethernet MAC 168 before being output over an Ethernet physical interface 170 to customer premise equipment 178, such as a personal computer, television, set-top box, etc.

Typical, cable modems perform some or all of the operations referred to in sequential packet processing circuitry 162 in software. This requires a CPU to repeatedly access external memory substantially increasing memory bandwidth utilization and processing cycles.

The cable modem 150 extracts packets once from memory 176. Subsequent processing is performed sequentially, and "on-the-fly" by internal hardware (or software if so desired). This saves memory bandwidth, and also allows for an architecture where packets can be temporarily stored in the internal packet buffer 166. The CPU 172 can then work on the packets without the added cycles required to access external memory 176.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A cable modem, comprising: wideband circuitry configured to receive radio frequency (RF) band data arriving downstream from a cable modem termination system (CMTS) external to the cable modem over multiple different downstream channels at the same time, the wideband circuitry demodulating signals in the different downstream channels and then formatting the demodulated signals into individual packets or frames for sending out over an Internet Protocol (IP) network interface; a narrowband circuit configured to operate in a narrowband mode; and a control bus coupling the narrowband circuit and the wideband circuitry and configured to allow the narrowband circuit to control the wideband circuitry via the control bus in order to selectively extract Data Over Cable Service Interface Specification (DOCSIS) data in a preconverted, modulated format from one of the multiple downstream channels such that the narrowband circuit receives the data after the data has been preprocessed by a conversion operation in the wideband circuitry and while the data is in a modulated format suitable for demodulation by the narrowband circuit; wherein the wideband circuitry includes a first Quadrature Amplitude Modulation (QAM) demodulator and the narrowband circuit comprises a second different QAM demodulator; and wherein the control bus passes the selectively extracted DOCSIS data from the wideband circuitry prior to such data being processed by the first QAM demodulator such that the selectively extracted DOCSIS data bypasses the first QAM demodulator of the wideband circuitry and is directed to the second different QAM demodulator of the narrowband circuit for demodulation.

2. The cable modem according to claim 1 including a central processing unit (CPU) in the narrowband circuit controlling through the control bus a wideband tuner in the wideband circuitry to connect a modulated one of the downstream channels to the narrowband circuit.

3. The cable modem according to claim 1 including a digital to analog (D/A) converter coupling a selected one of multiple digital outputs from an analog to digital (A/D) converter in the wideband circuitry to an A/D converter in the narrowband circuit.

4. The cable modem according to claim 1 including switching circuitry coupling a wideband downstream framer and a wideband upstream framer in the wideband circuitry with the narrowband circuit.

5. The cable modem according to claim 4 wherein the switching circuitry includes Ethernet switching logic that switches Ethernet frames between the wideband downstream framer, the wideband upstream framer, the narrowband circuit, and the IP network interface.

6. The cable modem according to claim 5 wherein the switching circuitry switches the Ethernet frames according to tags located in Ethernet packet headers.

7. The cable modem according to claim 1 including a snooping circuit in the wideband circuitry that monitors packets or frames received from all of the multiple downstream channels and forwards identified packets or frames to the narrowband circuit.

8. The cable modem according to claim 1 wherein the narrowband circuit and the wideband circuitry use a same upstream channel for sending data on an upstream path of a cable plant.

9. The cable modem according to claim 1 wherein same data flows are transported over the multiple different downstream channels at the same time.

10. A method for operating a cable modem, comprising:
receiving radio frequency (RF) band data signals arriving downstream from a cable modem termination system (CMTS) external to the cable modem over multiple different wideband downstream RF channels;
operating wideband circuitry that processes the RF band data signals on the multiple wideband channels and converts the wideband channel signals into Internet Protocol (IP) packets for sending over an IP network interface; and
operating a narrowband cable modem circuit to control the wideband circuitry via a control bus to selectively extract Data Over Cable Service Interface Specification (DOCSIS) data in a preconverted, modulated format from one of the multiple wideband channels processed in the wideband circuitry and to send the selectively extracted DOCSIS data over the IP network interface;
wherein the wideband circuitry includes a first QAM demodulator and the narrowband cable modem circuit comprises a second different QAM demodulator, and wherein the method further comprises:
passing the selectively extracted DOCSIS data from the wideband circuitry prior to such data being processed by the first QAM demodulator such that the selectively extracted DOCSIS data bypasses the first QAM demodulator of the wideband circuitry and is directed to the second different QAM demodulator of the narrowband cable modem circuit for demodulation.

11. The method according to claim 10 including:
using a wideband tuner in the wideband circuitry to convert analog signals received over the multiple wideband channels into associated digital data streams;
converting a selected one of the digital data streams back into an analog signal; and
inputting the analog signal into the narrowband cable modem circuit for processing as a narrowband downstream channel.

12. The method according to claim 11 including using a central processing unit (CPU) in the narrowband cable modem circuit to select via the control bus a modulated one of the digital data streams in the wideband circuitry for connecting to the narrowband cable modem circuit.

13. The method according to claim 12 including communicating between the CPU and the wideband circuitry using a control bus, wherein the control bus is an I$^2$C bus interface or a Serial Peripheral Interconnect (SPI) bus interface.

14. The method according to claim 10 including switching packets or frames between a wideband downstream framer in the wideband circuitry, the narrowband cable modem circuit, and an external IP network interface according to tags or IP addresses in the packets or frames.

15. The method according to claim 10 including identifying packets or frames in any of the multiple wideband channels that contain particular types of data and forwarding the identified packets or frames to the narrowband cable modem circuit.

16. The method according to claim 10 including outputting data from the narrowband cable modem circuit and the wideband circuitry over a same upstream channel on a cable plant.

17. The method according to claim 10 including:
storing the IP packets into an external memory;
reading the IP packets in resequenced order from the external memory;

conducting sequential packet processing operations on the IP packets read in resequenced order from the external memory in hardware without further accessing the external memory; and sending the IP packets to the IP network interface after the sequential packet processing operations.

18. A cable modem, comprising: wideband circuitry configured to receive radio frequency (RF) band data arriving downstream from a cable modem termination system (CMTS) external to the cable modem over multiple different downstream channels at the same time, the wideband circuitry including a block converter for down converting the RF band data as a block over the multiple different downstream channels, a first Quadrature Amplitude Modulation (QAM) demodulator for demodulating signals in the different downstream channels, and a framer for formatting the demodulated signals into individual packets or frames for sending out over an Internet Protocol (IP) network interface; and a narrowband circuit coupled to the wideband circuitry configured to operate in a narrowband mode and including a processor configured to control the wideband circuitry via a control bus to selectively extract Data Over Cable Service Interface Specification (DOCSIS) data from one of the multiple downstream channels after the DOCSIS data is processed by the block converter and before the DOCSIS data is processed by the first QAM demodulator; wherein the narrowband circuit comprises a second different QAM demodulator; and wherein the control bus passes the selectively extracted DOCSIS data from the wideband circuitry prior to such data being processed by the first QAM demodulator such that the selectively extracted DOGS IS data bypasses the first QAM demodulator of the wideband circuitry and is directed to the second different QAM demodulator of the narrowband circuit for demodulation.

19. The cable modem according to claim 18 wherein the wideband circuitry includes an analog-to-digital (A/D) converter to convert analog signals received over the multiple downstream channels into associated digital data streams and the cable modem further includes a digital-to-analog (D/A) converter for converting a selected one of the digital data streams back into an analog signal for inputting into the narrowband circuit.

20. The cable modem of claim 19 wherein the narrowband circuit includes an A/D converter and the selected one of the digital data streams is coupled by the D/A converter from the A/D converter in the wideband circuitry to the A/D converter in the narrowband circuit.

21. The cable modem of claim 20 wherein the processor is a Central Processing Unit (CPU) in the narrowband circuit configured to select via the control bus a modulated one of the digital data streams in the wideband circuitry.

22. The cable modem of claim 21 wherein the control bus uses an $I^2C$ bus interface or a Serial Peripheral Interconnect (SPI) bus interface.

23. The cable modem of claim 22 further including a first packet processing stage converting the RF band data into downstream transport packets and storing the packets in a serial buffering operation in an external memory.

24. The method of claim 10, further comprising:
demodulating any portion of the received RF band data signals that does not correspond to the selectively extracted DOCSIS data using the first QAM; and
demodulating a remaining portion of the received RF band data signals that does correspond to the selectively extracted DOCSIS data using the second QAM;
wherein the wideband circuitry and the narrowband cable modem circuit are operating in a same wideband cable modem.

25. An apparatus, comprising:
a narrowband cable modem having a first Quadrature Amplitude Modulation (QAM) demodulator;
wideband circuitry coupled to the narrowband cable modem and configured to receive radio frequency (RF) band data arriving downstream from a cable modem termination system (CMTS) over multiple different downstream channels at the same time, the wideband circuitry including a second QAM configured to demodulate signals in the different downstream channels;
wherein the narrowband cable modem and the wideband circuitry are located in a same wideband cable modem; and
means for selectively extracting Data Over Cable Service Interface Specification (DOCSIS) data from one of the multiple downstream channels and passing said selectively extracted DOCSIS data from the wideband circuitry prior to such data being processed by the first QAM demodulator such that the selectively extracted DOCSIS data bypasses the first QAM demodulator of the wideband circuitry and is directed to the second different QAM demodulator of the narrowband cable modem for demodulation.

26. The apparatus of claim 25, further comprising a processing device configured to transmit upstream transmissions to an Edge QAM (EQAM) of a distributed CMTS.

* * * * *

UNITED STATES PATENT AND TRADEMARK OFFICE
CERTIFICATE OF CORRECTION

| | | |
|---|---|---|
| PATENT NO. | : 7,720,101 B2 | Page 1 of 1 |
| APPLICATION NO. | : 11/134659 | |
| DATED | : May 18, 2010 | |
| INVENTOR(S) | : Chapman et al. | |

It is certified that error appears in the above-identified patent and that said Letters Patent is hereby corrected as shown below:

At column 11, line 31, please replace "DOGS IS" with --DOCSIS--.

Signed and Sealed this
Twenty-sixth Day of July, 2011

David J. Kappos
*Director of the United States Patent and Trademark Office*